(12) United States Patent
Shchemelinin et al.

(10) Patent No.: US 7,804,866 B1
(45) Date of Patent: Sep. 28, 2010

(54) PULSE STRETCHER

(75) Inventors: Anatoly Shchemelinin, Pleasanton, CA (US); Ilya Bezel, Sunnyvale, CA (US)

(73) Assignee: KLA-Tencor Technologies Corporation, San Jose, CA (US)

( * ) Notice: Subject to any disclaimer, the term of this patent is extended or adjusted under 35 U.S.C. 154(b) by 269 days.

(21) Appl. No.: 11/862,104

(22) Filed: Sep. 26, 2007

Related U.S. Application Data

(60) Provisional application No. 60/827,024, filed on Sep. 26, 2006.

(51) Int. Cl.
*H01S 3/10* (2006.01)

(52) U.S. Cl. .................... 372/25; 359/333; 359/348
(58) Field of Classification Search .......... 359/333, 359/349, 640, 831, 834; 372/25
See application file for complete search history.

(56) References Cited

U.S. PATENT DOCUMENTS

| 3,765,769 | A | * | 10/1973 | Treacy | 356/305 |
| 4,309,109 | A | * | 1/1982 | Blodgett et al. | 356/506 |
| 5,309,456 | A | * | 5/1994 | Horton | 372/25 |
| 5,428,226 | A | * | 6/1995 | Adams | 257/80 |
| 5,661,748 | A | * | 8/1997 | Zahavi et al. | 372/108 |
| 2002/0114075 | A1 | * | 8/2002 | Lissotschenko et al. | 359/559 |
| 2008/0138013 | A1 | * | 6/2008 | Parriaux | 385/37 |

FOREIGN PATENT DOCUMENTS

JP 05102927 A * 4/1993

OTHER PUBLICATIONS

U.S. Appl. No. 60/827,024, entitled "Pulse Stretcher" filed Sep. 26, 2006.

* cited by examiner

*Primary Examiner*—Eric Bolda
(74) *Attorney, Agent, or Firm*—Joshua D. Isenberg; JDI Patent

(57) ABSTRACT

A pulse stretcher includes a plurality of substantially parallel slab-like optical paths of different optical path lengths and a plurality of reflecting surfaces, which are totally internally reflecting surface formed, located at an end of the corresponding optical path. Due to the different path lengths, the pulse stretcher can spread out an input pulse into a stretched pulse having a longer pulse duration and proportionally lower intensity than the initial pulse.

19 Claims, 4 Drawing Sheets

PULSE STRETCHER

CROSS-REFERENCE TO RELATED APPLICATION

This application claims priority to U.S. Provisional application Ser. No. 60/827,024, entitled "PULSE STRETCHER" filed Sep. 26, 2006 the entire disclosures of which are incorporated herein by reference.

FIELD OF THE INVENTION

This invention generally relates to pulse stretchers, and more particularly to pulse stretcher for turning a single pulse into a pulse train with proportionally lower intensity of each pulse.

BACKGROUND OF THE INVENTION

The existing wafer inspection tools have marginal illumination capabilities due to naturally low brightness of arc lamps. High-powered lasers are often used as a source of illumination in lithographic systems. In general, suitable high-powered lasers are available in infra-red and visible light range. Generation of a UV (ultra-violet) or DUV (deep ultra-violet) illumination is obtained by third or fourth harmonic generation. The harmonic generation involves non-linear optic that is effective only at very high light intensities. Such high intensity can be achieved either by placing non-linear optic inside a high-quality resonator or by the use of pulse lasers. Short pulse lasers, such as mode-locked lasers, are often used because they are relatively inexpensive. The pulse lasers generate relatively short high intensity pulses. The short pulse DUV illumination, over time, damages optical components. The laser induced damage strongly depends on peak power of the illumination light.

It is within this context that embodiments of the present invention arise.

BRIEF DESCRIPTION OF THE DRAWINGS

Objects and advantages of embodiment of the present invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
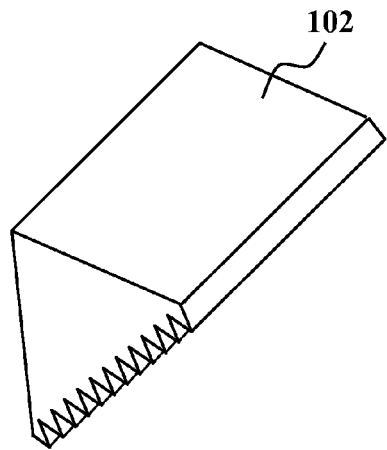
FIG. 1A is a perspective view of a pulse stretcher according to an embodiment of the present invention.
Figure 1B:
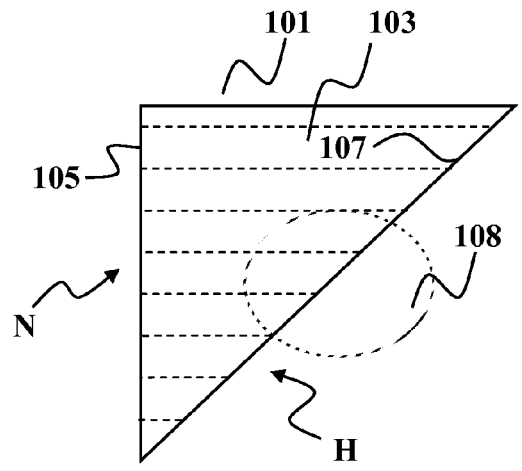
FIGS. 1B-1C are side cross-sectional views illustrating manufacture of the pulse stretcher of FIG. 1.
Figure 1C:
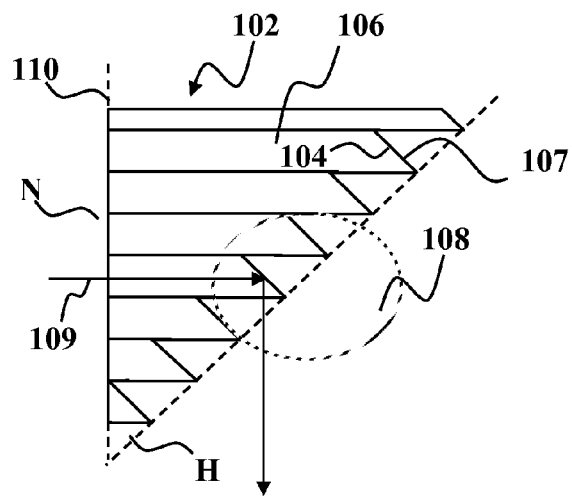

According to embodiments of the present invention, a pulse stretcher may be used in conjunction with a pulsed, high-intensity light source and optical components of a substrate inspection system. The pulse stretcher spreads out optical pulse from the light source over time, thereby reducing the peak intensity of the pulses. As shown in FIGS. 1A-1B, a pulse stretcher 102 may contain of a plurality of substantially parallel slab-like optical paths of different optical path lengths and a plurality of reflecting surfaces located at an end of a corresponding optical path. FIG. 1A illustrates a perspective view of a pulse stretcher 102. As shown in FIG. 1A, the plurality of optical paths of the pulse stretcher 102 may be in the form of a plurality of sections of a prism. FIGS. 1B-1C illustrate a possible method of manufacture of the pulse stretcher 102.

As seen in FIG. 1B, a right angle prism 101 is cut into a set of parallel slabs 103. The prism 101 is made of an optically transparent material. The prism has hypotenuse face H opposite an edge formed by a right angle intersection between two non-hypotenuse faces N. The slabs 103 are cut more or less perpendicular to a non-hypotenuse face N. The slabs 103 are cut such that slab 103 has a first end face 105 formed from a part of the non-hypotenuse face N. Each slab also has a second end face 107 formed from a portion of the hypotenuse face H. The slabs 103 may be cut using any suitable technique for cutting the material of the prism 101. Each slab may then be flipped about an axis of the slab running more or less perpendicular to the non-hypotenuse face N. The flipped slabs 103 are stacked to form the pulse stretcher 102 as seen in FIG. 1C. In the resulting stack of slabs 103, the first end faces 105 of the slabs 103 form a set of staggered angled deflecting surfaces. The slabs 103 may be attached to each other in any suitable manner, e.g., through use of an adhesive.

As shown in FIG. 1C, the pulse stretcher 102 is a right angle prism, which includes a plurality of substantially parallel slab-like optical paths 106 formed by the flipped slabs 103. The first ends 105 of the optical paths 106 are substantially aligned with each other, e.g., are aligned with respect to a common plane 110, and are located proximate a non-hypotenuse face N of the right angle prism that forms the pulse stretcher 102. The second ends 107 of the optical paths 106 are located proximate a hypotenuse face H of the right angle prism that forms the pulse stretcher 102. Reflecting surfaces 104 are located at a second end 107 of each optical path 106 and are substantially parallel to each other. The reflecting surfaces 104 deflect optical beams 109 out of the pulse stretcher such that each optical beam does not intersect any of the other optical beams. The reflecting surfaces 104 may be formed in any suitable fashion. For example, where the prism 102 is made of a light-refracting material, e.g., glass, plastic, and the like, the second ends 107 may be oriented at an angle and selected to provide total internal reflection. Alternatively, the second ends 107 may have reflectors, e.g. dielectric or metal mirrors.

Figure 1D:
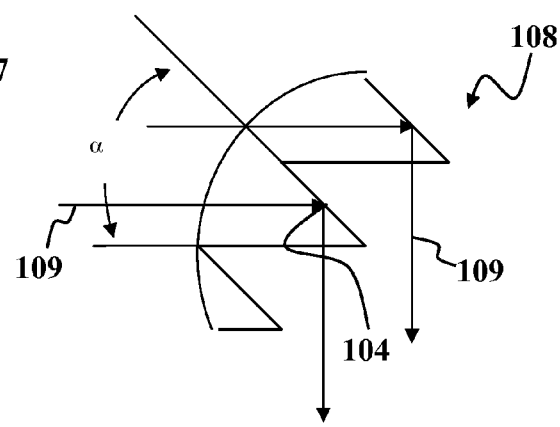
FIG. 1D illustrates a portion of the pulse stretcher according to an embodiment of the present invention.

FIG. 1D illustrates a portion 108 of the pulse stretcher 102 as described in FIG. 1C. The reflecting surface 104 at the second end 107 may oriented at an angle α of 45° to the beam path to obtain a 90° deflection of a portion of an incident beam. It is noted that the reflecting surfaces 104 may alternatively be formed by cutting angled facets into a hypotenuse face of a right angle prism.

In the example depicted in FIGS. 1C-1D, beams of pulsed light 109 come from the left of the pulse stretcher 102 and are deflected downward by the optical paths. Because the optical paths have different path lengths, the deflected light from one optical path doesn't cross the deflected light from other optical paths and the delays of the pulses in each optical path are also different. The deflected beams are focused to a common spot, through some optical components, e.g., lenses or focusing mirrors, where all optical paths are spatially overlapped resulting in a longer duration of the pulse laser beam.

Figure 2:
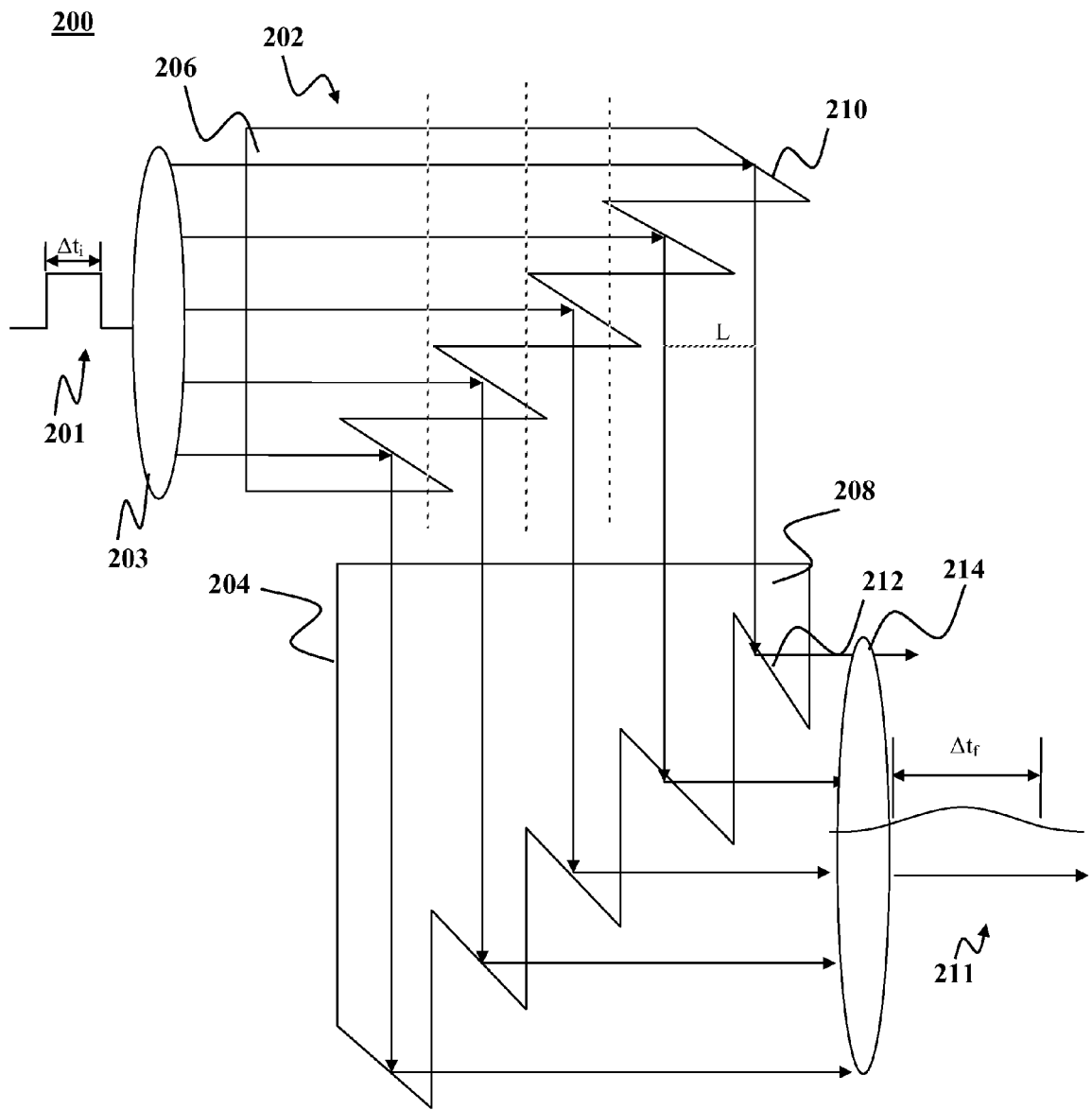
FIG. 2 illustrates a cross section view of a double-pass pulse stretcher according to another embodiment of the present invention.

FIG. 2 illustrates a double-pass pulse stretcher 200 according to another embodiment of the present invention. As shown in FIG. 2, the pulse stretcher 200 includes of two components 202 and 204. The pulse stretcher 200 receives an input pulse 201 of pulse duration $\Delta t_i$ and produces an output pulse 211 having a longer pulse duration $\Delta t_f$ and a reduced overall intensity. The structure of each component 202 and 204 is similar as the prism 102 as described in FIGS. 1A-1C. The optical system 200 may include a beam expander 203 to spatially expand the input optical pulse 201 before it is coupled into the first prism 202. As shown in FIG. 2, the first prism 202 contains a first plurality of substantially parallel slab-like optical paths 206 of different optical path lengths and a first plurality of reflecting surfaces 210. The second prism 204 includes a second plurality of substantially parallel slab-like optical paths 208 of different optical path lengths and a second plurality of reflecting surfaces 212. The first plurality of slab-like optical paths 206 and second plurality of slab-like optical paths 208 are optically coupled to each other and are oriented with respect to each other in such a way as to present a grid of optical path delays. In this example, each of the prisms 202 and 204 deflects light at 90°. As shown in FIG. 2, the pulse laser beam is coming from the left, entering the horizontal optical paths 206 of the prism 202 and is deflected down. The deflected pulsed laser beam then enters the vertical optical paths 208 of the second prism 204 and is deflected to the right. Together, the two prisms 202 and 204 cut the coming pulse laser beam into rectangular segment, creating 2-dimentional delay matrix. To avoid the repetition of the delays of the pulses in each optical path, the pulse delay step of the first prism 202 is different with the pulse delay step of the second prism 204. Note that the minimum delay difference between any two optical paths is 1 pulse duration. By way of example, the pulse duration step of the prism second 204 is 1.1 times of the pulse duration step of the first prism 202. If a 10 pulse duration step is used in the first prism 202, then an 11 pulse duration step is used in the second prism 204, which results in a delay matrix as shown below.

The system 200 may optionally include optical components 214 optically coupled to the second prism 204 that combine the outgoing beams e.g., by focusing them onto a common spot to form the stretched output pulse 211. The different optical path lengths of the optical paths 206 lead to a longer pulse duration $\Delta t_f$ for the stretched output pulse 211 compared to the initial pulse duration $\Delta t_i$.

Figure 3:
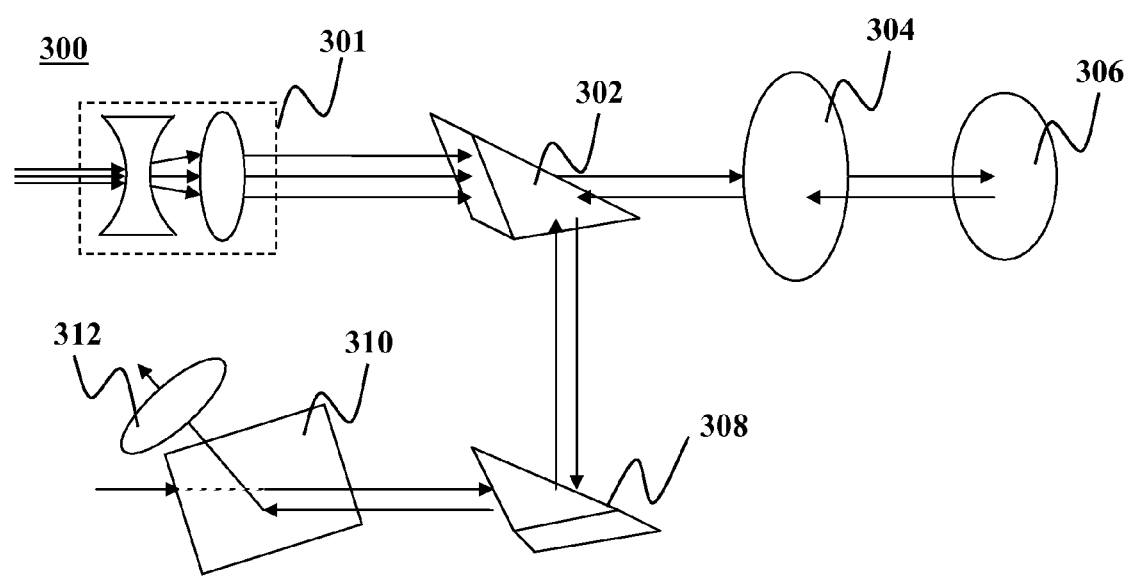
FIG. 3 illustrates a side view of a double-pass pulse stretcher system of the type shown in FIG. 2.

FIG. 3 illustrates an optical system 300 that includes the double-pass pulse stretcher described in FIG. 2. As shown in FIG. 3, optical system 300 includes a first prism 302, a second prism 308, a quarter-wave ($\lambda/4$) plate 304, a mirror 306 and a polarizer 310. The beam, which is horizontal, vertical and circular polarization, is coming form the left. After passing through the coupled prisms 302 and 304, the beam is reflected back by the mirror 306 and is deflected by polarizer 310. The quarter-wave plate 304 ensures the polarization rotation. The polarizer 310 separates incoming and outgoing beams. The optical system 300 may optionally include a beam expander 301, e.g., having a concave lens and a convex lens to spatially expand the input optical pulse before it is coupled into the first prism 302. Furthermore, the system 300 may optionally include optical components 312 that combine the outgoing beams e.g., by focusing them onto a common spot.

It is noted that in alternative embodiments, an optical system similar to that shown in FIG. 3 may be based on a single pulse stretcher of the types described herein. Furthermore, non-uniform prisms of the pulse stretcher of the present invention can be used to compensate for the non-uniform (Gaussian) intensity distribution in the coming beam. This application reduces the number of prisms by enlarging of the periphery optical paths, which results in cost reduction.

Figure 4A:
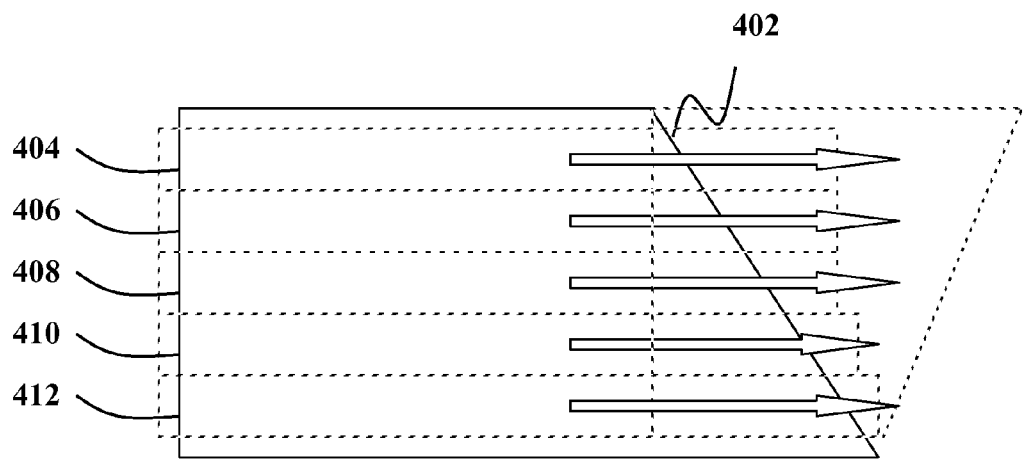
FIGS. 4A-4C illustrates manufacture of a pulse stretcher according to an embodiment of the present invention.
Figure 4B:
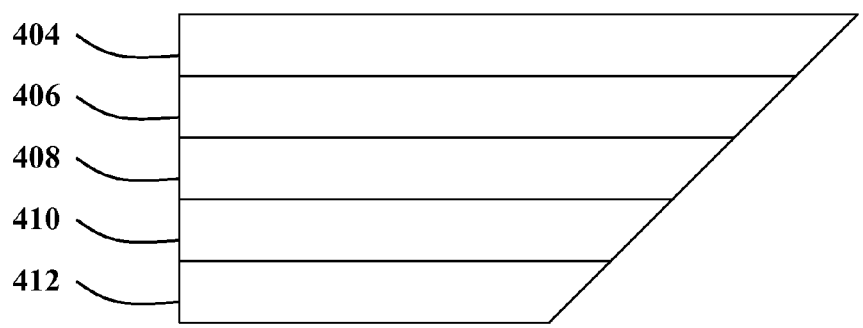
Figure 4C:
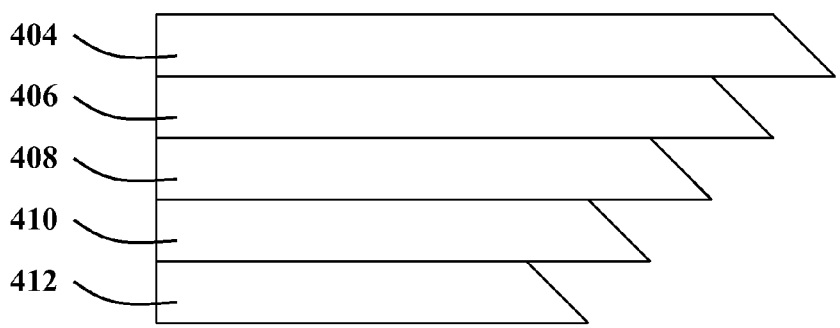

FIGS. 4A-4C illustrate an example of manufacture of a single pulse stretcher of the type described in FIGS. 1A-1B. As shown in FIG. 4A, the deflected surface 402 first is manufactured as a prism's surface. The prism then is cut horizontally in substantially parallel slab-like segments 404, 406, 408, 410 and 412 with the required pitch as shown in FIG. 4B.

For example, 10-ps pulse duration of mode-lock laser results in a 3-mm travel distance in air. If fused silica is used to make the prism, the index of refraction of fused silica is about 1.5, in order to achieve 10-ps delay, 1.2 mm pitch is required. The segments 404, 406, 408, 410 and 412 are then each flipped vertically and re-stacked as shown in FIG. 4C. The flipping and re-stacking of the segments 404, 406, 408, 410 and 412, produces a staggered set of reflecting surfaces of the kind-described above with respect to FIGS. 1A-1C.

FIGS. 4A-4C depict a prism having a more or less flat input face at the first end to facilitate manufacture. The first ends of the segments 404, 406, 408, 410 and 412 can be aligned against a vertical reference flat. Such a feature is not to be regarded as a limitation of any embodiment of the invention.

|    | 1   | 2   | 3   | 4   | 5   | 6   | 7   | 8   | 9   | 10  | 11  |
|----|-----|-----|-----|-----|-----|-----|-----|-----|-----|-----|-----|
| 1  | 21  | 32  | 43  | 54  | 65  | 76  | 87  | 98  | 109 | 120 | 131 |
| 2  | 31  | 42  | 53  | 64  | 75  | 86  | 97  | 108 | 119 | 130 | 141 |
| 3  | 41  | 52  | 63  | 74  | 85  | 96  | 107 | 118 | 129 | 140 | 151 |
| 4  | 51  | 62  | 73  | 84  | 95  | 106 | 117 | 128 | 139 | 150 | 161 |
| 5  | 61  | 72  | 83  | 94  | 105 | 116 | 127 | 138 | 149 | 160 | 171 |
| 6  | 71  | 82  | 93  | 104 | 115 | 126 | 137 | 148 | 159 | 170 | 181 |
| 7  | 81  | 92  | 103 | 114 | 125 | 136 | 147 | 158 | 169 | 180 | 191 |
| 8  | 91  | 102 | 113 | 124 | 135 | 146 | 157 | 168 | 179 | 190 | 201 |
| 9  | 101 | 112 | 123 | 134 | 145 | 156 | 167 | 178 | 189 | 200 | 211 |
| 10 | 111 | 122 | 133 | 144 | 155 | 166 | 177 | 188 | 199 | 210 | 221 |
| 11 | 121 | 132 | 143 | 154 | 165 | 176 | 187 | 198 | 209 | 220 | 231 |

Figure 4D:
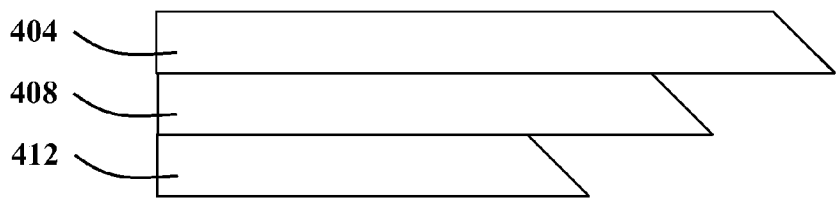
FIG. 4D illustrates a different type of a pulse stretcher prism having a step-shaped input face at the first end of the prism.

FIG. 4D illustrates a different type of a pulse stretcher prism having a step-shaped input face at the first end of the prism. To manufacture this type of the pulse stretcher, after flipping of the segments 404, 406, 408, 410 and 412 as described above in FIG. 4C, removing the segments 406 and 410, then restacking the segments 404, 408 and 412 such that the second end faces of the slabs form a set of staggered angled deflecting surface. By way of example and without loss of generality, the second ends of the segments 404, 408, and 412 may be aligned against a 45° angle reference flat to achieve a desired stagger of the segments. Two pulse stretchers of the type shown in FIG. 1D may be optically coupled together in a manner similar to that shown in FIG. 3.

Inaccuracy in the positions of the segments may vary the pulse delays and affect the efficiency, but doesn't affect the quality of the deflected beam.

Use of a refractive material for the optical paths (e.g., slab-like segments 404) is shown for the purpose of example and is not a limitation of an embodiment of the invention. Slab-like optical paths filled with air or vacuum and having appropriate lengths and configuration of reflecting surfaces may alternatively be used to obtain the desired pulse delays.

From the foregoing, it may be seen that optical pulse stretchers based on multiple optical paths having different optical path lengths as shown and described herein provide a means for implementing a method for temporally stretching an optical pulse. Specifically, an initial optical pulse may be spatially divided into a plurality of optical beams, e.g., by passing the initial beam through a beam expander and coupling the resulting expanded beam into a pulse stretcher of any of the types described above. The plurality of optical beams are then transmitted through a plurality of substantially parallel slab-like optical paths of different optical path lengths. Each optical path has a first end and a second end. The first ends of the optical paths are substantially aligned with each other, e.g., as describe above. The plurality of optical beams are reflected from a plurality of reflecting surfaces. Each reflecting surface is located at a second end of a corresponding optical path. Each reflecting surface is adapted to deflect a corresponding one of the optical beams out of the corresponding optical path such that the optical beam does not intersect any of the other optical paths. The plurality of optical beams may then be spatially recombined to form a stretched pulse. Such recombination may be accomplished by coupling all of the beams into a common optical fiber or, alternatively, by optically equivalent free-space techniques. Due to the different optical path lengths for each beam, the timing of the pulses in the stretched pulse leads to a longer pulse duration for the stretched pulse compared to the initial pulse duration for the initial optical pulse.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A pulse stretcher, comprising:
   a plurality of substantially parallel slab-like optical paths of different optical path lengths, each optical path having a first end and a second end, wherein the first ends of the optical paths are substantially aligned with each other
   a plurality of reflecting surfaces, wherein each reflecting surface is located at a second end of a corresponding optical path, wherein each reflecting surface is adapted to deflect an optical beam out of the pulse stretcher such that the optical beam does not intersect any of the other optical paths.

2. The apparatus of claim 1 wherein the plurality of reflecting surfaces are substantially parallel to each other.

3. The apparatus of claim 1 wherein the plurality of optical paths are in the form of a plurality of sections of a prism.

4. The apparatus of claim 3, wherein the prism is a right angle prism.

5. The apparatus of claim 4 wherein the first ends of the optical paths are located proximate a non-hypotenuse face of the right angle prism and wherein the second ends are located proximate a hypotenuse face of the right angle prism.

6. The apparatus of claim 1, further comprising means for focusing optical beams from the different optical paths to a common spot.

7. The apparatus of claim 1, further comprising means for focusing optical beams from the different optical paths to a common spot.

8. The apparatus of claim 1 further comprising a second plurality of substantially parallel slab-like optical paths of different optical path lengths, each optical path having a first end and a second end, wherein the first ends of the optical paths are substantially aligned with each other; and
   a second plurality of reflecting surfaces, wherein each reflecting surface is located at a second end of a corresponding optical path, wherein each reflecting surface is adapted to deflect an optical beam out of the pulse stretcher such that the optical beam does not intersect any of the other optical paths, wherein the first and second pluralities of slab-like optical paths are optically coupled to each other, wherein the first and second pluralities of slab-like optical paths are oriented with respect to each other in such a way as to present a grid of optical path delays.

9. The apparatus of claim 8 wherein the optical path lengths of the optical paths in the first and second pluralities are chosen so that no two optical path delays in the grid are the same.

10. A method for temporally stretching an optical pulse, comprising:
   spatially dividing an initial optical pulse into a plurality of optical beams;
   transmitting the plurality of optical beams through a plurality of substantially parallel slab-like optical paths of different optical path lengths, each optical path having a first end and a second end, wherein the first ends of the optical paths are substantially aligned with each other
   reflecting the plurality of optical beams from a plurality of reflecting surfaces, wherein each reflecting surface is located at a second end of a corresponding optical path, wherein each reflecting surface is adapted to deflect a corresponding one of the optical beams out of the corresponding optical path such that the optical beam does not intersect any of the other optical paths; and
   spatially recombining the plurality of optical beams to form a stretched pulse, whereby the different optical path lengths lead to a longer pulse duration for the stretched pulse compared to an initial pulse duration for the initial optical pulse.

11. An optical system, comprising:

a beam expander;

a plurality of substantially parallel slab-like optical paths of different optical path lengths optically coupled to the beam expander, wherein the slab-like optical paths are configured to spatially divide an initial optical pulse into a plurality of optical beams, wherein each optical path having a first end and a second end, wherein the first ends of the optical paths are substantially aligned with each other;

a plurality of reflecting surfaces, wherein each reflecting surface is located at a second end of a corresponding optical path, wherein each reflecting surface is adapted to deflect an optical beam out of the pulse stretcher such that the optical beam does not intersect any of the other optical paths; and one or more optical components optically coupled to the plurality of reflecting surfaces, wherein the one or more optical components are configured recombine the plurality of optical beams to form a stretched pulse, whereby the different optical path lengths lead to a longer pulse duration for the stretched pulse compared to an initial pulse duration for the initial optical pulse.

12. The apparatus of claim 11 wherein the plurality of reflecting surfaces are substantially parallel to each other.

13. The apparatus of claim 11 wherein the plurality of optical paths are in the form of a plurality of sections of a prism.

14. The apparatus of claim 13, wherein the prism is a right angle prism.

15. The apparatus of claim 14 wherein the first ends of the optical paths are located proximate a non-hypotenuse face of the right angle prism and wherein the second ends are located proximate a hypotenuse face of the right angle prism.

16. The apparatus of claim 15 wherein each reflecting surface is a totally internally reflecting surface formed.

17. The apparatus of claim 11, further comprising means for focusing optical beams from the different optical paths to a common spot.

18. The apparatus of claim 11 further comprising a second plurality of substantially parallel slab-like optical paths of different optical path lengths, each optical path having a first end and a second end, wherein the first ends of the optical paths are substantially aligned with each other; and a second plurality of reflecting surfaces, wherein each reflecting surface is located at a second end of a corresponding optical path, wherein each reflecting surface is adapted to deflect an optical beam out of the pulse stretcher such that the optical beam does not intersect any of the other optical paths, wherein the first and second pluralities of slab-like optical paths are optically coupled to each other, wherein the first and second pluralities of slab-like optical paths are oriented with respect to each other in such a way as to present a grid of optical path delays.

19. The apparatus of claim 18 wherein the optical path lengths of the optical paths in the first and second pluralities are chosen so that no two optical path delays in the grid are the same.

* * * * *